United States Patent
Philips

[19]

[11] Patent Number: 5,848,107
[45] Date of Patent: Dec. 8, 1998

[54] TRANSMISSION SYSTEM WITH IMPROVED SYMBOL PROCESSING

[75] Inventor: Norbert J. L. Philips, Leuven/Haasrode, Belgium

[73] Assignee: U. S. Philips Corporation, New York, N.Y.

[21] Appl. No.: 696,430

[22] Filed: Aug. 14, 1996

[30] Foreign Application Priority Data

Aug. 16, 1995 [EP] European Pat. Off. ............ 95202217.6

[51] Int. Cl.$^6$ ................................................... H04L 27/06
[52] U.S. Cl. ............................................. 345/342; 375/355
[58] Field of Search .................................. 375/342, 348, 375/355, 224, 226, 316, 259

[56] References Cited

U.S. PATENT DOCUMENTS

| | | | |
|---|---|---|---|
| 5,345,440 | 9/1994 | Gledhill et al. ........................ | 370/203 |
| 5,450,456 | 9/1995 | Mueller .................................. | 375/224 |
| 5,537,419 | 7/1996 | Parr et al. ............................. | 375/355 |

FOREIGN PATENT DOCUMENTS

WO96/19056   11/1995   European Pat. Off. .

*Primary Examiner*—Temesghen Ghebretinsae
*Attorney, Agent, or Firm*—Edward W. Goodman

[57] ABSTRACT

In OFDM transmission use of an FFT is made for demodulating all carriers simultaneously. In order to prevent adverse influence of intersymbol interference due to multi-path propagation, it is known to determine the impulse response of the transmission medium and to adapt the FFT window accordingly. The center of gravity of the impulse response is now used rather than the first significant value of the impulse response. This has the advantage that the influence of deep fading has less influence on the selection of the FFT window, resulting in an improved performance.

10 Claims, 3 Drawing Sheets

TRANSMISSION SYSTEM WITH IMPROVED SYMBOL PROCESSING

BACKGROUND OF THE INVENTION

1. Field of the Invention

The present invention is related to a transmission system comprising a transmitter for transmitting digital symbols via a transmission medium to a receiver, the receiver, comprising means for estimating the impulse response of the transmission medium, the receiver further, comprising processing means for processing, in dependence on the impulse response of the transmission medium, the received signal during a predetermined processing period.

The invention is further related to a receiver for use in such a transmission system.

2. Description of the Related Art

A transmission system according to the preamble is known from the paper "General-purpose and application-specific design of a DAB channel decoder" by F. van de Laar, N. Philips and R. Olde Dubbelink in EBU Technical Review, Winter 1993, pp. 25–35.

In transmission of digital symbols over radio channels, several transmission impairments have to be dealt with. A first impairment is so called multi-path transmission, which is caused by transmission of a signal from a transmitter to a receiver via one direct path and/or via one or more indirect paths due to reflection by buildings and other structures. In digital transmission systems, multi-path transmission results into intersymbol interference, leading to an increased error probability of the received digital symbols. A further impairment which is a consequence of multi-path transmission is frequency selective fading. This means that fading can occur which heavily depends on the signal to be transmitted. With increasing symbol rate, the adverse effect of the previously mentioned impairments becomes more manifest.

Important improvements with respect to the vulnerability to the above mentioned impairments can be obtained by using a multiple carrier signal comprising a multiple of carriers, at least a part of them being modulated with the digital symbols to be transmitted. A sequence of symbols having a first symbol rate is subdivided into N parallel sequences of symbols having a second symbol rate being a factor N lower than the first symbol rate. Said N sequences of symbols are modulated on N carriers. In the receiver, these N carriers are demodulated, and decisions about the values of the received symbols are made. The N received sequences of symbols can be combined to one single sequence of output symbols. Due to the reduction of the transmission rate of each sequence of symbols, the influence of intersymbol interference due to multi-path propagation is decreased accordingly.

Despite the fact that the present invention is presented in relation to multi-carrier transmission, the scope of the present invention is not limited thereto. It is perfectly possible to apply the present invention to a single carrier transmission system.

To reduce the effects of multi-path transmission even more, the received signal is processed during a predetermined processing period which can be shorter than said symbol period. The difference between the symbol period and the processing period is often called the guard band. The position of the processing period is chosen such that the received signal does not contain parts arising from subsequently transmitted symbols due to multi-path propagation. If the so called delay spread is smaller than the guard interval, it is always possible to find a position of the processing period in which no intersymbol interference is present. In order to be able to position the processing period correctly, the impulse response of the transmission medium is determined. It is observed that it is possible that the processing period is not shorter than the symbol period. This can result in some intersymbol interference. By selecting the position of the processing period with respect to the symbol period in a proper way, it is possible to minimize said intersymbol interference.

SUMMARY OF THE INVENTION

An object of the present invention is to provide a transmission system according to the preamble in which the correct position of the processing period with respect to the symbol period is determined in a reliable way.

Therefore the transmission system according to the invention is characterized in the receiver comprises means for positioning the processing period with respect to the symbol duration in dependence on the central position of an auxiliary signal representative of the impulse response of the transmission medium.

By deriving the position of the processing period from the central position of an auxiliary signal representative of the impulse response, a correct position is obtained. If the impulse response is symmetrical around a reference instant, the processing period can be positioned centrally within a symbol period. The symbol period then overlaps the processing period with an amount equal to half the guard space G. The center position of the impulse response is then equal to said reference instant. If the impulse response has a post-cursor larger than the pre-cursor, the center position will shift to a later instant. The larger post cursor leads to increased intersymbol interference at the beginning of the symbol interval. By shifting the processing interval to a later instant, it is obtained that the intersymbol interference at the beginning of the symbol interval has no adverse effect on the transmission quality any more.

If the impulse response has a pre-cursor larger than the post-cursor, the center position will shift to a earlier instant. The larger pre-cursor leads to increased intersymbol interference at the end of the symbol interval. By shifting the processing interval to a earlier instant, it is obtained that the intersymbol interference at the beginning of the symbol interval has no adverse effect on the transmission quality any more. An additional advantage is the substantial reduction of the influence of deep fades on the synchronization behavior. The center position of the impulse response can e.g., be the "center of gravity" of the impulse response, or the average position of the most significant samples of the impulse response.

An embodiment of the invention is characterized in that the means for positioning the processing period is arranged for weighting parts of the auxiliary signal in dependence of their position with respect to the center position of the auxiliary signal.

By emphasizing parts of the auxiliary signal remote from the center position it is obtained that parts remote from the center position, of the auxiliary signal lead to a firm correction of the position of the processing period. This firm correction is required because these remote parts introduce substantial intersymbol interference, especially if they are positioned more than G/2 away from the center position of the auxiliary signal.

A further embodiment of the invention is characterized in that the means for positioning the processing period comprises compression means for obtaining an auxiliary signal having a smaller duration than the impulse response of the transmission medium.

In case of a Raleigh fading channel with a large delay spread, it can occur that the center position of the auxiliary signal changes rapidly over a large range. By compressing the auxiliary signal, the range over which the center position varies is reduced. This leads to a smoother control of the position of the processing window.

BRIEF DESCRIPTION OF THE DRAWINGS

The invention will now be explained in more detail with reference to the drawing. Herein.

DESCRIPTION OF THE PREFERRED EMBODIMENT

Figure 1:
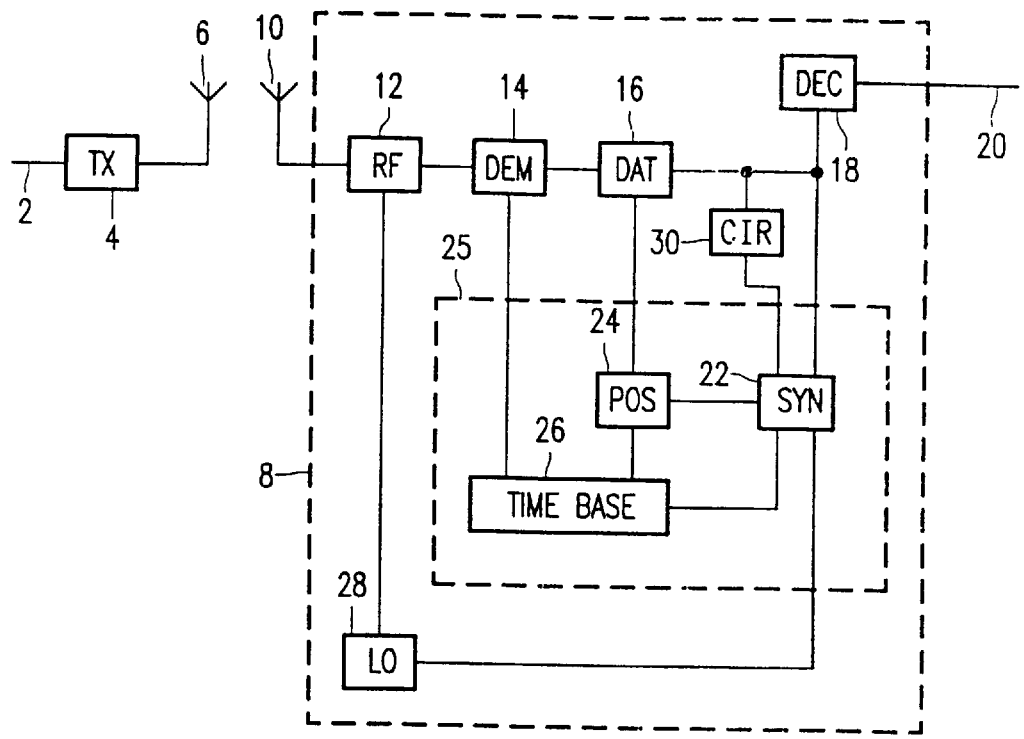
FIG. 1 shows, a transmission system in which the present invention can be applied.

In the transmission system according to FIG. 1, the digital symbols to be transmitted is applied to a transmitter 4. The output of the transmitter 4 are connected to a transmitting antenna 6.

A receiving antenna 10 is connected to a first input of a receiver 8. In the receiver 8 the input is connected to an RF unit 12. An output of a local oscillator (LO) 28 is connected to a second input of the RF unit 12. The output of the RF unit 12 is connected to an input of a demodulator 14. The output of the demodulator 14 is connected to an input of the processing means, being here an FFT processor (DAT) 16. The output of the FFT processor is connected to a decoder 18, a first input of a synchronisation processor 22, and to an estimator 30 for estimating the impulse response of the transmission medium. An output of the estimator 30 is connected to a second input of the synchronization processor 22. A first output of the synchronization processor 22 is connected to an input of a positioner 24 for the FFT processor 16. A second output of the synchronization processor 22 is connected to a control input of a timebase unit 26, and a third output of the synchronization processor 22 is connected to a control input of the local oscillator 28. The combination of the synchronization processor 22, the positioner 24 and the timebase 26 constitute the means for positioning the processing period with respect to the symbol period. At the output of the decoder 18, the signal to be transmitted is available.

A typical transmission system where the present invention can be applied is the Digital Audio broadcast System (DAB) as disclosed in the previously mentioned paper. The transmitter 4 in FIG. 1 is assumed to generate a signal comprising a multiple of carriers. Such a signal is often called an OFDM (Orthogonal Frequency Division Multiplex) signal. The digital symbols presented at the input of the transmitter are converted in blocks of N parallel symbols. These blocks of N parallel symbols are encoded, time and frequency interleaved, to obtain blocks of N coded and interleaved symbols. Each of such symbols are modulated on one of the plurality of carriers. This modulation is performed by an inverse Fourier transformer. The output of the inverse Fourier transformer is upconverted to the desired carrier frequency and subsequently amplified.

An OFDM signal received by the receiver 8 is amplified and converted to an IF signal by the RF unit 12. For this conversion, the RF unit 12 is supplied with a local oscillator signal generated by the local oscillator 28. The output signal of the RF unit 12 is demodulated by the demodulator 14. The demodulator 14 presents its output signal in inphase and quadrature components. To obtain the digital symbols modulated on the plurality of carriers, the output of the demodulator 14 is applied block wise to the FFT processor 16. In order to minimize the effect of intersymbol interference, the FFT processor 16 receives a signal from the positioner 24 defining the position of the processing period with respect to the symbol period. This signal is derived by the synchronization processor 22 from the impulse response determined by the estimator 30 for estimating the impulse response of the transmission medium. The estimator 30 is arranged to derive the impulse response of the transmission medium from the output signal of the FFT processor 16. For determination of the impulse response of the transmission medium, use is made of a reference symbol s transmitted at the beginning of an OFDM frame. The symbol s can be regarded as a vector comprising N complex elements. The output signal r of the FFT processor 16 can be regarded as a sequence of vectors each comprising N complex elements. The beginning of an OFDM frame is indicated by a so-called null symbol which consists of a period in which the amplitude of the transmitted signal is almost zero. Using this null symbol, a first estimate for the position of the reference symbol in the received signal can be made. The impulse response can now be found by calculating:

$$h(k)=FFT^{-1}\{r \cdot s^*\} \tag{1}$$

In (1), r·s* means the element wise product of the vector r and the complex conjugate of the vector s.

The synchronization processor 22 also provides a frequency correction signal for controlling the local oscillator 28 in order to reduce the frequency offset of the receiver. It is observed that the frequency correction can also be obtained by a phase rotator, such as a CORDIC processor, in the signal path between RF unit 12 and decoder 18. The synchronization processor also provides a control signal for adjusting the time base 26 in order to synchronize it to the timebase of the transmitter.

At the output of the FFT processor 16, the coded and interleaved symbols are available. These symbols are de-interleaved and decoded by the decoder 18 to obtain the reconstructed digital symbols.

Figure 2:
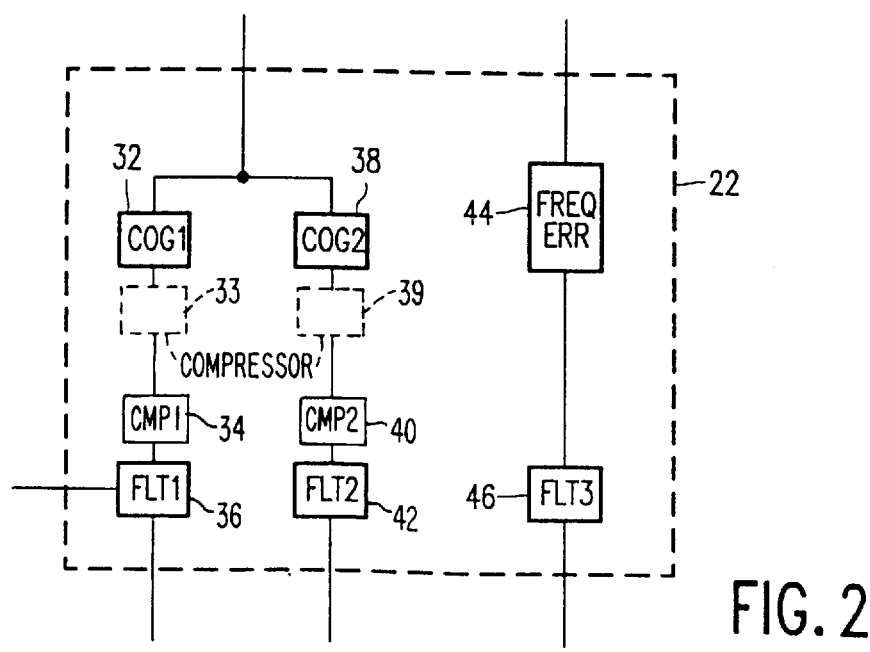
FIG. 2 shows, processing period positioning means according to the invention.

In the synchronization processor 22, as shown in FIG. 2, the second input is connected to an input of first determining means (COG1) 32 for determining a central position of the auxiliary signal, in order to derive a first auxiliary signal from the channel impulse response and to determine a first central position of this auxiliary signal. An output of the first determining means 32 is connected to an input of a comparator 34. An output of the comparator 34 is connected to an input of a filter 36. An output of the filter 36 is the first output of the synchronization processor 22 and is applied to the positioner 24 for positioning the processing period of the FFT processor 16.

The second input of the synchronization processor 22 is also connected to an input of second determining means (COG2) 38 for determining a central position of the auxiliary signal, in order to derive a second auxiliary signal from the channel impulse response and to determine a second central position of this auxiliary signal. An output of the second determining means 38 is connected to an input of a comparator 40. An output of the comparator 40 is connected to an input of a filter 42. An output of the filter 42 is the second output of the synchronization processor 22 and is applied to the timebase 26 for controlling the digital timebase of the receiver.

The first input of the synchronization processor is applied to a frequency error detector 44. The output of the frequency error detector 44 is connected to an input of a filter 46. The output of the filter 46 is the third output of the synchronization processor 22 and is used to control the local oscillator 28.

The first and second determining means 32 and 38 derive a first and a second auxiliary signal from the impulse response, and calculate a central position of these auxiliary signals. The auxiliary signal can e.g., be derived from the impulse response by calculating its absolute value or its squared value. A suitable measure of these central position is the center of gravity (or weighting of parts) of the auxiliary signal. If the auxiliary signal can be written as a time discrete signal P(k), for the center of gravity one finds:

$$G = \frac{\sum_{k=1}^{N} k \cdot P(k)}{\sum_{k=1}^{N} P(k)} \qquad (2)$$

In the comparators 34 and 40 the actual positions of the center positions of the auxiliary signals, as calculated by the means 32 and 38, are compared with desired values of said central positions.

By comparing the first central position with a first desired reference position in comparator 34, a control value can be determined by filter 36. The output of filter 36 can be used to modify the position the position of the processing period of FFT processor 16 within the symbol period by means of the position control means 24 in such a way that the central position moves towards the reference position of comparator 34. In a typical application, the position of the processing window is defined as an offset with respect to a reference signal generated by the timebase 26. Generally, the range of the position control is limited to the symbol period or the guard period. It can be used to react on fast changes of the channel impulse response. A permanent large offset indicates a misalignment of the digital timebase. The filter 36 is a high-pass filter in order to enable a fast reaction on fast changes of the impulse response, and to suppress any action on a permanent offset which has to be dealt with by the timebase 26.

By comparing the second central position with a second desired reference position in comparator 40, a control value can be calculated in filter 42. The control output of filter 40 can be used to adjust the digital timebase 26 in such a way that the central position moves towards the reference position of comparator 40. The timebase can be adjusted by controlling the digital clock oscillator and/or the clock dividers in the timebase. In a typical application, the filter 46 is a low-pass filter and the control output will be used to compensate tolerances of the digital clock oscillator and to keep the timebase locked to the received frames.

Modifying the position of the processing window with respect to the received symbols can also be done by adjustment of the timebase only. In this case, the offset of the positioner 24 with respect to the timebase reference should have a fixed value.

The frequency error detector 44 derives a measure for the frequency offset of the receiver. This measure is used to correct the frequency of the local oscillator.

In case of a Raleigh fading channel with a large delay spread, it can occur that the center position of the auxiliary signal changes rapidly over a large range. To that end, compressors 33 and 39 may be added after the first and second determining means 32 and 38 for compressing the auxiliary signal, thereby reducing the range over which the center position varies. This leads to a smoother control of the position of the processing window.

Figure 3:
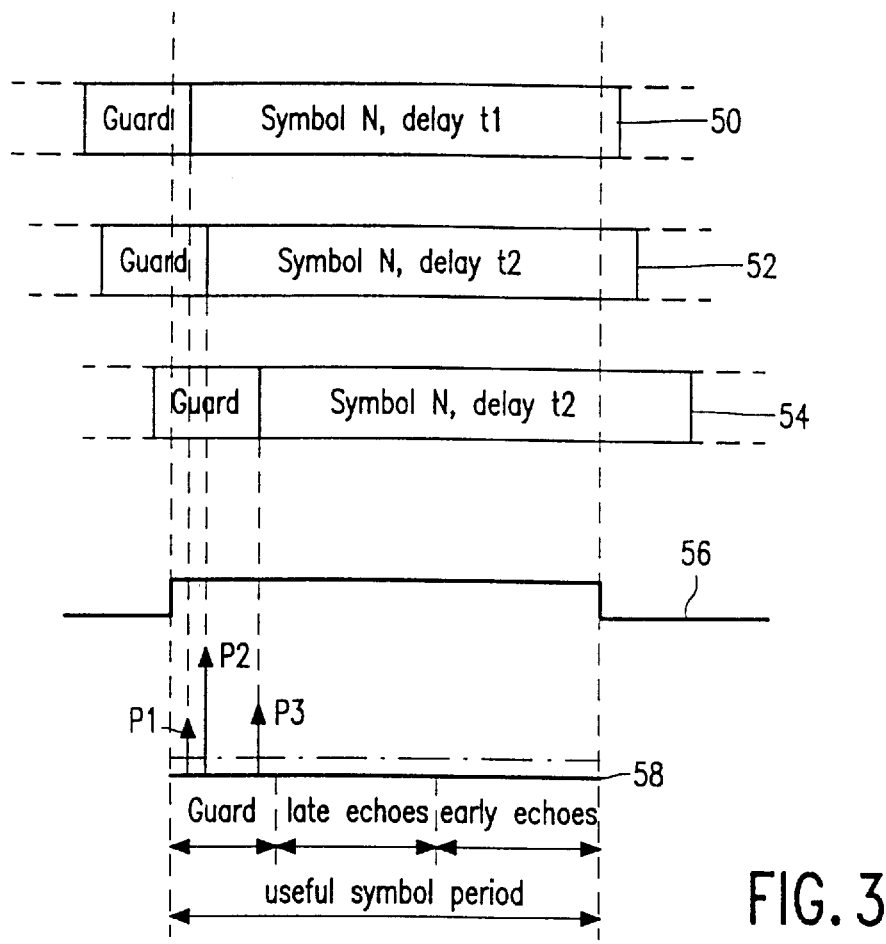
FIG. 3 shows, a graphical representation of the selection of the processing window according to the invention.

In FIG. 3 graphs 50, 52 and 54 show a OFDM symbol reaching the receiver via several paths after a delay $t_1$, $t_2$ and $t_3$, respectively. The received OFDM signal is a combination of the signals according graphs 50, 52 and 54. Graph 56 shows a suitable processing period in which no contribution from OFDM symbols other than the present one is received. Graph 58 shows the auxiliary function derived from the impulse response calculated using (1) in the processing period as indicated in FIG. 3. A preferred position GP for the center of gravity of the auxiliary function is located at GL/2 from the beginning of the processing period, as is indicates in graph 58, where GL indicated the length of the guard. By calculating the center of gravity using (2) and comparing it with the preferred value GP, a correction signal for adjusting the processing period and/or the digital timebase can easily be derived.

Figure 4:
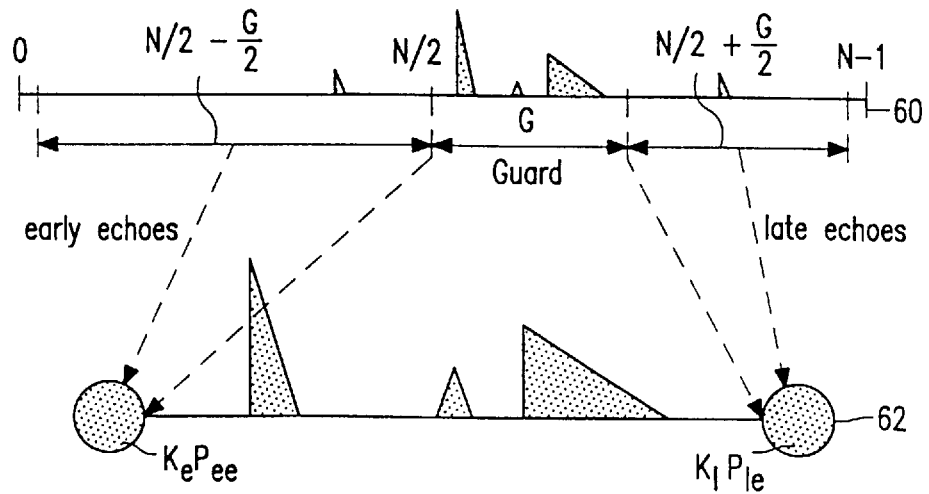
FIG. 4 shows, a graphical representation of a way to emphasize the remote parts of the auxiliary function.

Graph 60 in FIG. 4 shows an auxiliary signal having part remote from the center position. The early echoes have been drawn in the actual time order, in contradistinction to graph 58 in FIG. 3, where the auxiliary signal is drawn as it is stored in the output buffer of the FFT processor 16. In graph 62, an auxiliary signal comprising remote parts is drawn. From this signal, a modified auxiliary signal having emphasized remote parts is formed. This can be done by adding all values of the early echoes to obtain a value $P_{ee}$, multiplying the value $P_{ee}$ by a gain factor $K_e$, and positioning the value so obtained at position k=N/2−G/2. For the late echoes, the same is done by adding all values of the late echoes to obtain a value $P_{1e}$, multiplying the value $P_{1e}$ by a gain factor $K_1$, and positioning the value so obtained at position k=N/2+G/2. In graph 62, the modified auxiliary signal is drawn. It is observed that alternative ways exist for obtaining a modified auxiliary signal, such as, multiplying the values of the auxiliary function with a factor that increases with increasing distance from the center position.

Figure 5A:
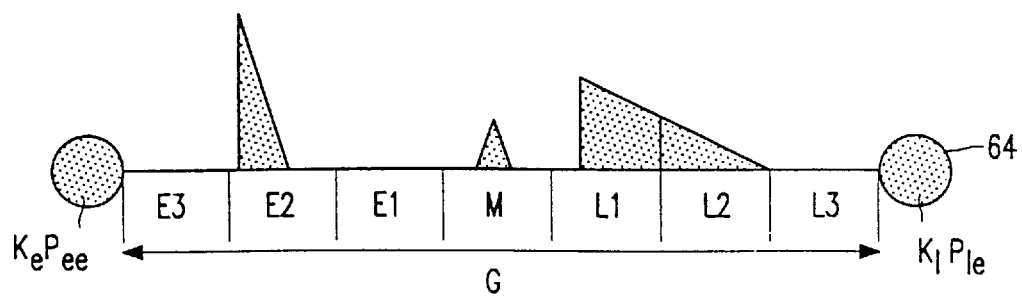
FIG. 5 shows, a graphical representation of a way to reduce the duration of the auxiliary function.
Figure 5B:
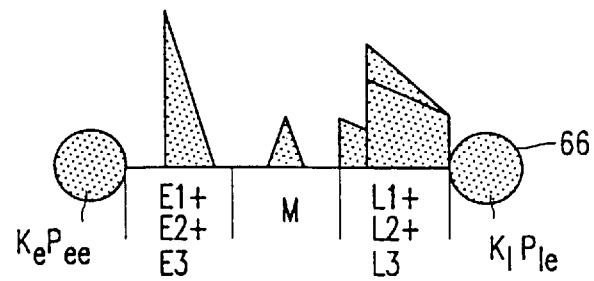

In graph 64 of FIG. 5, the modified auxiliary signal, according to graph 62 of FIG. 4, is redrawn, but the period G is subdivided in sections $E_3$, $E_2$, $E_1$, M, $L_1$, $L_2$ and $L_3$. A further modified auxiliary signal with a reduced duration is obtained by combining the sections $E_1$, $E_2$ and $E_3$ in a first section, and combining the sections $L_1$, $L_2$ and $L_3$ in a second section. This way of combining is shown in graph 66 of FIG. 5. From this graph it is clear that the duration of the further auxiliary signal is reduced.

A modification of the auxiliary signal can be useful for emphasizing or de-emphasizing certain parts of the impulse response. It can also be used to reduce the jitter on the value of G in case of, for example, c, a large delay spread in the transmission medium. In general, the modification of the auxiliary signal can be expressed as a function F(k) which can be used to calculate a modified center of gravity $G_m$ as follows:

$$G_m = \frac{\sum_{k=-N/2}^{N/2} F(k) \cdot P(k)}{\sum_{k=-N/2}^{N/2} P(k)} \quad (3)$$

Figure 6:
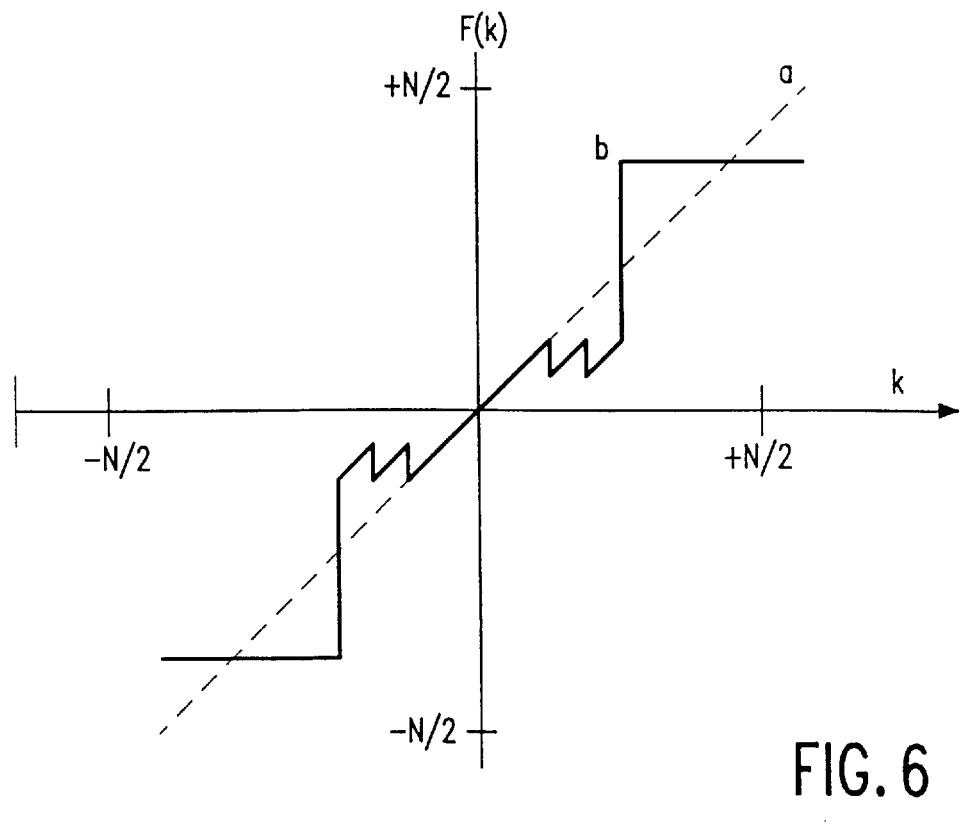
FIG. 6 shows, several functions F(k) to be used in the calculation of a modified center of gravity.

For convenience, the range of k is made symmetrical around 0. In FIG. 6, some functions F(k) are shown. Graph a in FIG. 6 shows F(k) for the calculation of the center of gravity without modification of the auxiliary function. This is equivalent to (2). Graph b shows F(k) for the modifications represented by graph 66 in FIG. 5. It is clear that also other shapes for F(k) can be defined.

I claim:

1. Transmission system comprising a transmitter for transmitting a signal containing digital symbols via a transmission medium, and a receiver for receiving the signal transmitted by the transmitter, the receiver comprising:

means for receiving the signal transmitted by the transmitter;

means for estimating an impulse response of the transmission medium; and processing means for processing, in dependence on the impulse response of the transmission medium, the received signal during a predetermined processing period, characterized in that the receiver further comprises:

means for positioning the predetermined processing period with respect to a symbol duration in dependence on a center position of an auxiliary signal representative of the impulse response of the transmission medium.

2. Transmission system according to claim 1, characterized in that the means for positioning the predetermined processing period comprises means for weighting parts of the auxiliary signal in dependence on positions of the parts of the auxiliary signal with respect to the center position of the auxiliary signal.

3. Transmission system according to claim 2, characterized in that the means for positioning the predetermined processing period comprises means for emphasizing parts of the auxiliary signal lying outside of a predetermined interval around the center position.

4. Transmission system according to claim 1, characterized in that the transmitter transmits the signal containing the digital symbols according to a multi-carrier modulation scheme.

5. Transmission system according to claim 1, characterized in that the means for positioning the predetermined processing period comprises compression means for obtaining an auxiliary signal having a smaller duration than the impulse response of the transmission medium.

6. Receiver for receiving a signal containing digital symbols transmitted via a transmission medium, the receiver comprising:

means for receiving the signal;

means for estimating an impulse response of the transmission medium; and processing means for processing, in dependence on the impulse response of the transmission medium, the received signal during a predetermined processing period, characterized in that the receiver further comprises:

means for positioning the predetermined processing period with respect to a symbol duration in dependence on a center position of an auxiliary signal representative of the impulse response of the transmission medium.

7. Receiver according to claim 6, characterized in that the means for positioning the predetermined processing period comprises means for weighting parts of the auxiliary signal in dependence on positions of the parts of the auxiliary signal with respect to the center position of the auxiliary signal.

8. Receiver according to claim 7, characterized in that the means for positioning the predetermined processing period comprises means for emphasizing parts of the auxiliary signal lying outside of a predetermined interval around the center position.

9. Receiver according to claim 8, characterized in that the signal received by said receiver is modulated according to a multi-carrier modulation scheme.

10. Receiver according to claim 6, characterized in that the means for positioning the predetermined processing period comprises compression means for obtaining an auxiliary signal having a smaller duration than the impulse response of the transmission medium.

* * * * *